Dec. 12, 1939.　　　L. G. BOWMAN　　　2,182,911
METHOD OF FORMING SEAMS
Filed Oct. 19, 1936　　　3 Sheets-Sheet 1
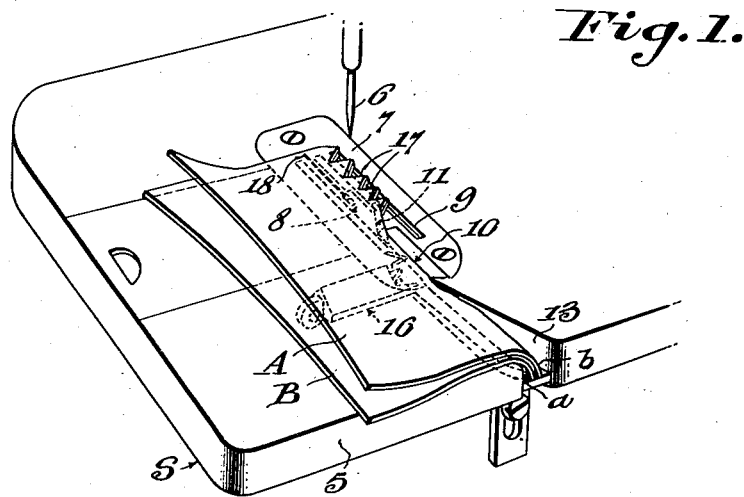
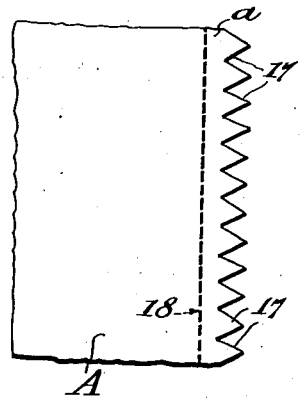
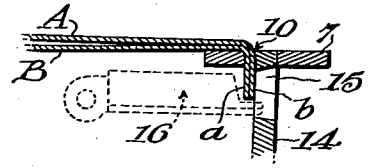
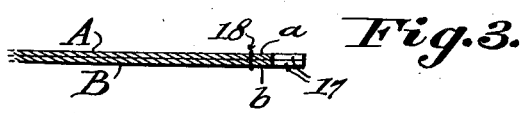
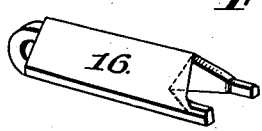
Inventor
Louis G. Bowman
By S. George Tate
Attorney Dec. 12, 1939.  L. G. BOWMAN  2,182,911
METHOD OF FORMING SEAMS
Filed Oct. 19, 1936  3 Sheets-Sheet 2
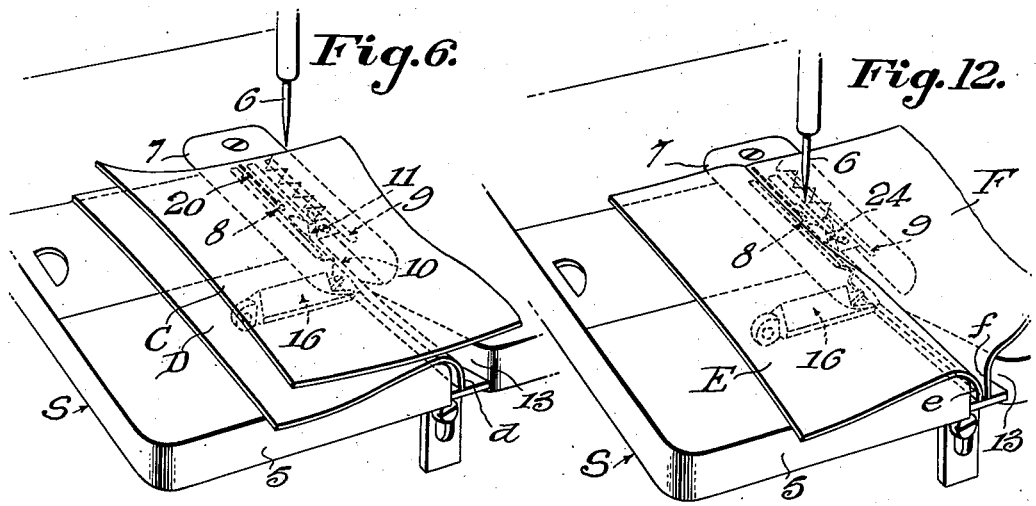
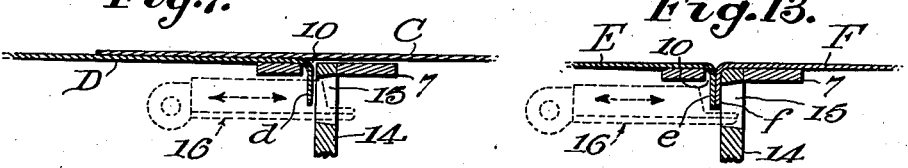
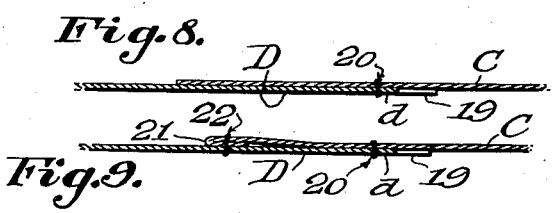
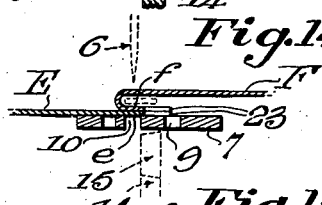
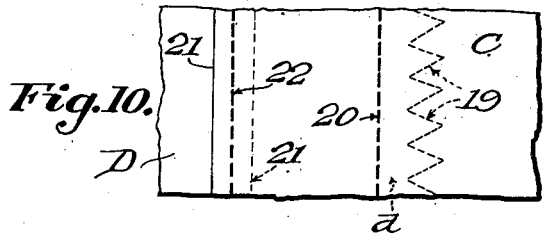
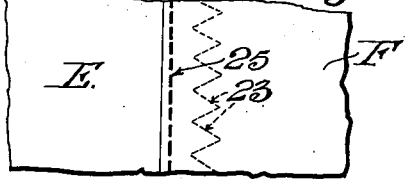
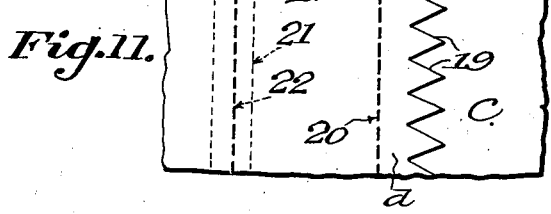
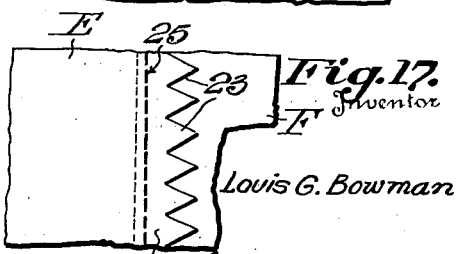
Louis G. Bowman Dec. 12, 1939.  L. G. BOWMAN  2,182,911
METHOD OF FORMING SEAMS
Filed Oct. 19, 1936   3 Sheets-Sheet 3
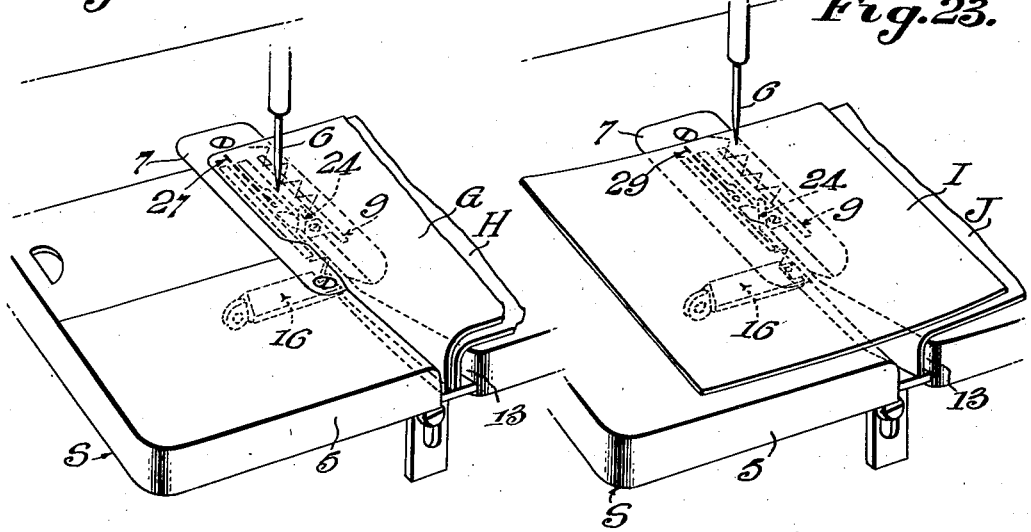
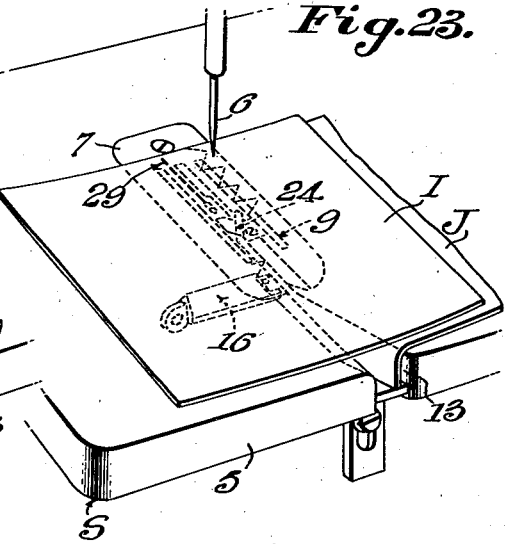
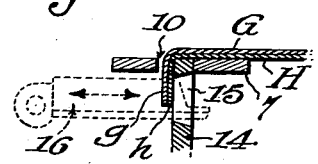
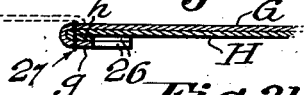
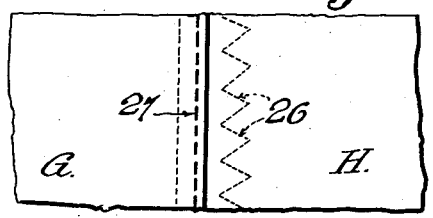
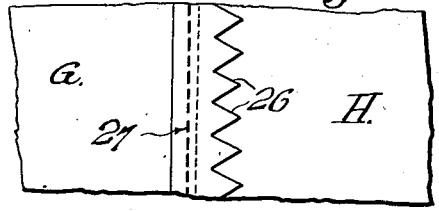
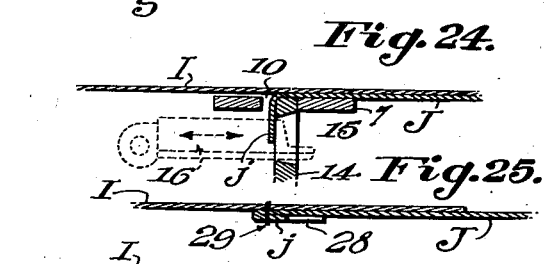
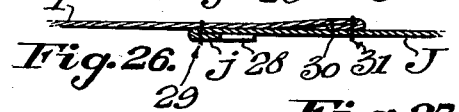
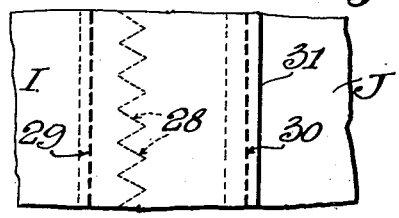
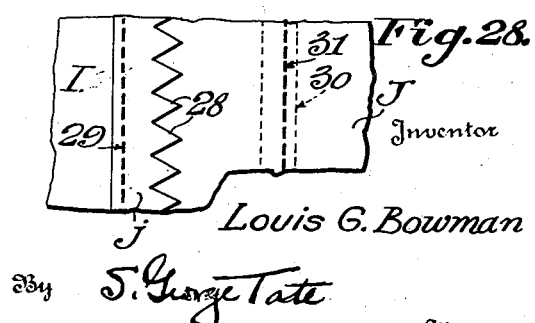
Inventor
Louis G. Bowman
By S. George Tate
Attorney Patented Dec. 12, 1939

2,182,911

UNITED STATES PATENT OFFICE 2,182,911

METHOD OF FORMING SEAMS

Louis G. Bowman, St. Louis, Mo., assignor to Lewis Invisible Stitch Machine Company, St. Louis, Mo., a corporation of Maine Application October 19, 1936, Serial No. 106,484

7 Claims. (Cl. 112—262)

This invention relates to a method of forming sewed ornamental seams.

In the Gruman Patent 1,891,308, Dec. 20, 1932, a seam is formed by superposing two body fabrics and then cutting pinks along the edge thereof and simultaneously uniting the sections by a line of stitches.

The principal object of the present invention is to provide a novel method of forming such a seam and modifications thereof, wherein the pinking is accomplished prior to the seaming operation.

With the above and other objects in view which will more fully appear, the nature of the invention will be more clearly understood by following the description, the appended claims, and the several views illustrated in the accompanying drawings.

In the drawings:

Figures 1, 2 and 3 are views illustrating the steps employed in forming a seam,

Figure 4 is a plan view of the seam formed by the method disclosed in Figures 1, 2 and 3, Figure 5 is a perspective view of the movable pinking knife, Figures 6 to 9 are views illustrating the steps employed in forming another seam, Figures 10 and 11 are top and bottom plan views of the seam formed by the method disclosed in Figures 6 to 9, Figures 12 to 15 are views illustrating the steps employed in forming another seam, Figures 16 and 17 are top and bottom plan views of the seam formed by the method disclosed in Figures 12 to 15, Figures 18 to 20 are views illustrating the steps employed in forming another seam, Figures 21 and 22 are top and bottom plan views of the seam formed by the method disclosed in Figures 18 to 20, Figures 23 to 26 are views illustrating the steps employed in forming another seam, and Figures 27 and 28 are top and bottom plan views of the seam formed by the method disclosed in Figures 23 to 26.

Like reference numerals designate corresponding parts throughout the several figures of the drawings.

In Figures 1 to 5, I have disclosed a new method of forming the pinked edge seams shown in the patent to Gruman referred to above. In these figures, two superposed body fabrics A and B are disposed in a general horizontal plane upon the work support 5 of a sewing machine S. The sewing machine is provided with a stitch forming mechanism including a vertically reciprocatory needle 6, the body fabrics proper being on the left hand side of the needle. Mounted on the work support 5 is a throat plate 7 having the usual needle opening 8, and also the usual feed slots 9 in which a feed dog operates to feed the fabrics intermittently up to and past the needle. The throat plate is provided with a guiding slot 10 which extends rearwardly from the front edge thereof to a point in front of the needle opening 8 where it terminates in a rearwardly inclined edge 11 which extends to the right of the needle opening. The work support 5 is provided with a fabric guiding slot 13 which extends rearwardly from the front edge thereof and is in open communication with the front end of the slot 10. Disposed below the throat plate 7 on the right hand side of the slot 10, and supported by the work support 5, is a vertical ledger blade 14 having an inverted V-shaped or triangular opening 15 formed therein. A horizontal blade or knife 16 is located below the throat plate 7 and mounted for reciprocations across the slot 10 and cooperates with the ledger blade 14. The movable blade or knife 16 is of inverted V-shape in cross section and has a sliding and cooperating fit with the opening 15 of the ledger blade. The superposed body fabrics A and B are fed to the needle 6 by the feed dog, and the edge portions $a$ and $b$ of said fabrics are initially turned downwardly at right angles thereto and are positioned in parallel planes in the slot 13 of the work support 5. As the feed of the fabrics progresses, the downturned edge portions $a$ and $b$ are passed along the slot 10 between the ledger blade 14 and the movable knife 16 which cooperate to cut a series of connected pinks 17 in both edge portions simultaneously. Immediately following the pinking operation, the pinked edge portions $a$ and $b$ are turned into the general horizontal plane of the body fabrics by the inclined guiding edge 11 of the throat plate, the pinked edges being located on the right hand side of the needle 6. The needle then functions to unite the fabric sections A and B by a line 18 of stitches which is located in spaced parallel relation to the pinked edge.

In Figures 6 to 11, I have disclosed another seam and method of forming the same. In these figures, two superposed body fabrics C and D are disposed in a general horizontal plane on the work support 5 with their edges arranged in overlapping relation. The edge portion $d$ of the lower fabric is initially turned downwardly into a plane at right angles thereto and is positioned in the slot 13 of the work support, whereas the body fabric c extends on both sides of the needle 6. As the feed of the fabrics progresses, the edge portion d is passed along the slot 10 between the ledger blade 14 and the movable knife 16 which cooperate to cut a series of connected pinks 19 in said edge portion d. Immediately following the pinking operation, the edge portion d is turned upwardly by the inclined guiding edge 11 and into the general horizontal plane of the fabrics, the pinked edge portion d being located on the right hand side of the needle 6 and under the body fabric C. The needle 6 then functions to unite the body fabrics C and D by a line 20 of stitches which is located in spaced parallel relation to the pinked edge of the fabric D. One edge portion of the upper fabric C is then turned under as at 21 and a line 22 of stitches is then formed to unite the turned edge portion 21 to the body fabric D, the lines 20 and 22 of the stitches being disposed in spaced parallel relation.

In Figures 12 to 17, I have disclosed another seam and method of forming the same. In these figures, two body fabrics E and F are respectively positioned in a general horizontal plane on the work support 5 on opposite sides of the needle 6. The edge portions e and f of said body fabrics are initially turned downwardly into a plane at right angles thereto and are positioned in parallel planes in the slot 13 of the work support 5. As the feed of the fabric progresses, the downturned edge portions e and f are passed along the slot 10 between the ledger blade 14 and the movable blade 16 which cooperate to cut a series of connected pinks 23 in said edge portions e and f. Immediately following the pinking operation the pinked edge portions e and f are turned upwardly by a guiding edge 24 on the throat plate 7 and into the general horizontal plane of the body fabrics, the edge portions e and f being positioned under the body fabric F. The needle 6 then functions to unite the body fabric F with both edge portions e and f by a line 25 of stitches which is located in spaced parallel relation to the pinked edges.

In Figures 18 to 22, I have disclosed another seam and method of forming same. In these figures two superposed body fabrics G and H are disposed in a general horizontal plane on the work support 5 and on the right of the needle 6. The edge portions g and h of the body fabrics are initially turned downwardly into a plane at right angles thereto and are positioned in parallel planes in the slot 13 of the work support 5. As the feed of the fabrics progresses, the downturned edge portions g and h are passed along the slot 10 between the ledger blade 14 and the movable knife 16 which cooperate to cut a series of connected pinks 26 in both edges simultaneously. Immediately following the pinking operation, the pinked edge portions g and h are turned into the general horizontal plane of the body fabrics by the edge guide 24 on the throat plate 7, both edge portions being located directly under both body fabrics. The needle 6 then functions to unite both edge portions and both body fabrics by a line 27 of stitches which is located in spaced parallel relation to the pinked edges.

In Figures 23 to 28, I have disclosed another seam and method of forming the same. In these figures, two superposed fabrics I and J are disposed in a general horizontal plane on the work support 5 with their edges arranged in overlapping relation, the upper fabric I extending on opposite sides of the needle and the lower fabric J being on the right hand side of the needle. The edge portion j of the lower body fabric is initially turned downwardly into a plane at right angles thereto and positioned in the slot 13 of the work support 5. As the feed of the fabric progresses, the downturned edge portion j is passed along the slot 10 between the ledger blade 14 and the movable knife 16 which cooperate to cut a series of connected pinks 28 in said edge portion j. Immediately following the pinking operation, the pinked edge portion j is turned by the guiding edge 24 on the throat plate 7 into the general horizontal plane of the body fabrics, said edge portion being disposed under the lower body fabric J. The needle 6 then functions to unite both body fabrics I and J and the pinked edge portion j by a line 29 of stitches which is located in spaced parallel relation to the pinked edge. One edge portion of the upper fabric I is then turned under as at 30 and a line 31 of stitches is formed to unite the turned edge portion 30 to the lower fabric J, the lines 29 and 31 of the stitches being disposed in spaced parallel relation.

It is of course to be understood that the details of structure and arrangement of parts may be variously changed and modified without departing from the spirit and scope of my invention.

I claim:

1. The method of forming a seam, consisting in positioning body fabric portions-to-be-joined on a common plane, turning adjacent edge portions of the body fabric portions into contacting relation in a plane at right angles to the body fabric portions, then pinking simultaneously both of said turned edge portions, and while maintaining the parallel relation of said edge portions finally uniting said pinked edge portions by a line of stitches located in spaced parallel relation to the line of pinks.

2. The method of forming a seam, consisting in first turning adjacent edge portions of body fabrics into contacting relation in parallel planes at right angles to the body fabrics, then pinking simultaneously both of said turned edge portions, maintaining the contacting relation of the pinked edge portions and turning them into the general plane of said body fabrics, and finally uniting said pinked edge portions by a line of stitches located in spaced parallel relation to the line of pinks.

3. The method of forming a seam, consisting in first turning adjacent edge portions of body fabrics into contacting relation in parallel planes at right angles to the body fabrics, then pinking simultaneously both of said turned edge portions, maintaining the contacting relation of the pinked edge portions and turning both pinked edge portions against one body fabric, and finally uniting said turned edge portions and said one body fabric by a line of stitches located in spaced parallel relation to the line of pinks.

4. The herein described method of forming a pinked seam which consists in, first, bringing the body fabrics into superposed relation with their edge portions in approximate registry; second, turning the superposed edge portions of the body fabrics out of the general plane of the fabrics and maintaining the contacting relation of said edge portions; third, pinking the body fabric edge portions while turned; fourth, maintaining the contacting relation of the pinked edge portions and returning the pinked edge portions to the general plane of the body fabrics; and finally uniting the body fabrics by a line of stitches paralleling the line of pinks.

5. The herein described method of forming a seam which consists in, first, disposing body fabrics side by side in a common plane with the adjacent edge portions thereof in contacting relation and turned into parallel planes at right angles thereto; second, pinking the turned edge portions; third, maintaining the contacting relation of the pinked edge portions and returning the pinked edge portions to the general plane of the fabrics; and finally uniting the fabrics by a line of stitches paralleling the line of pinks while retaining the body fabrics in the same general plane.

6. The herein described method of forming a seam which consists in, first, disposing body fabrics side by side in a common plane with the adjacent edge portions thereof in contacting relation and turned into parallel planes at right angles thereto; second, pinking the turned edge portions; third, maintaining the contacting relation of the pinked edge portions and returning the pinked edge portions to the general plane of the fabrics by turning said edge portions against one of the body fabrics thereby positioning one body fabric proper and its pinked edge portion in a common plane and forming an edge fold in the other body fabric; and finally uniting the body fabrics by a line of stitches passing through the edge fold and the underlying body fabric edge portion and paralleling the line of pinks.

7. The herein described method of forming a pinked seam which consists in, first, bringing the body fabrics into superposed relation with their edge portions in approximate registry; second, turning the superposed edge portions out of the general plane of the body fabrics; third, pinking said edge portions while turned; fourth, maintaining the contacting relation of the pinked edge portions and returning the pinked edge portions to the general plane of and against and in superposed relation to the body fabrics forming a double edge fold; and finally uniting the body fabrics and the edge portions by a line of stitches passing through the edge fold.

LOUIS G. BOWMAN.